United States Patent [19]

Kobayashi et al.

[11] Patent Number: 4,899,617
[45] Date of Patent: Feb. 13, 1990

[54] ROTARY DRIVE TRANSMITTING MECHANISM WITH DAMPING SPRINGS

[75] Inventors: Kiyonori Kobayashi, Chiryu; Masakazu Kamiya, Toyoake; Junji Kagiyama, Kariya, all of Japan

[73] Assignee: Aisin Seiki Kabushiki Kaisha, Kariya, Japan

[21] Appl. No.: 251,405

[22] Filed: Sep. 30, 1988

[30] Foreign Application Priority Data

Sep. 30, 1987 [JP] Japan .............. 62-150087[U]

[51] Int. Cl.$^4$ .............................. F16F 15/12
[52] U.S. Cl. ................... 74/574; 192/106.2; 464/68
[58] Field of Search ............ 74/574; 192/106.2, 106.1, 192/70.17; 464/64, 68, 85

[56] References Cited

U.S. PATENT DOCUMENTS

| | | | |
|---|---|---|---|
| 1,345,446 | 7/1920 | Johnson | 464/85 |
| 3,547,243 | 12/1970 | Joern | 192/106.1 X |
| 4,197,931 | 4/1980 | Norcia | 464/68 X |
| 4,351,168 | 9/1982 | Prince et al. | 192/106.1 X |
| 4,613,029 | 9/1986 | Beccaris | 464/85 X |
| 4,663,983 | 5/1987 | Kobayashi et al. | 192/106.2 |
| 4,767,380 | 8/1988 | Chassequet | 464/68 |

FOREIGN PATENT DOCUMENTS 62-42174 10/1987 Japan .

Primary Examiner—Rodney M. Lindsey
Attorney, Agent, or Firm—Burns, Doane, Swecker & Mathis

[57] ABSTRACT

A rotary drive transmitting mechanism comprises a drive plate, a driven plate operably connected to a flywheel, and coil damping springs operably interposed between the drive and driven plates. Each end of the coil spring carries a seat which engages the drive plate or driven plate. Each seat has a surface which impacts against the respective plate. The surface includes concave and convex portions which mate with respective convex and concave portions of the drive plate or driven plate. The concave and convex portions include elastic layers for suppressing noise. Elastic layers are also provided on other surfaces of the seats which face each other through the spring.

4 Claims, 3 Drawing Sheets

ROTARY DRIVE TRANSMITTING MECHANISM WITH DAMPING SPRINGS

BACKGROUND OF THE INVENTION

1. Field of the Invention

This invention relates to a drive transmitting mechanism including damping springs for use in an internal combustion engine of a car, ship, etc.

2. Description of the Prior Art

A damping mechanism which is disclosed in Japanese Utility Model Application No. 55 (1980)-18110 comprises a coil spring and a seat for retaining the coil spring. The coil spring has two seats at both ends thereof and is circumferentially compressibly interposed between a drive plate and a driven plate, the latter connected to a flywheel. Each seat has concave and convex portions formed in semicircular shape and arranged to abut the drive plate or the driven plate. In cooperation with the concave and convex portions of the spring seat, the drive plate and the driven plate are provided with convex portions and concave portions, respectively. Elastic members are positioned solely at shoulder portions of the spring seat for the suppression of noise as the spring engages the drive plate or driven plate.

In practice, at low rotation speeds of the internal combustion engine, no striking sound occurs when the spring seat strikes the driven plate, due to the presence of the elastic members. However, during the starting or stopping of the engine, the striking noise occurs. It has been found by the present inventors that as the rotation rate of the engine passes through the range of the resonance frequency of the apparatus during the starting or stopping of the engine, a torque acts on the damping mechanism which is larger than the torque which would result solely from the low rotation rate of the engine. As a result, the bottom surface of the concave portion and the uppermost surface of the convex portion of the spring seat strike directly the drive plate or the driven plate, thereby producing appreciable noise.

SUMMARY OF THE INVENTION

It is an object of this invention to provide a damping mechanism in a force transmitting mechanism in which the abovementioned drawback is eliminated.

In order to accomplish the object, there is provided a drive plate, a driven plate connected to a flywheel, and a damping member between the drive plate and driven plate which is comprised of a coil spring and two spring seats. Each spring seat has an elastic member on faces thereof which engage the drive plate and driven plate, respectively.

BRIEF DESCRIPTION OF THE DRAWINGS

Other objects and advantages of the present invention will be understood more clearly from the detailed description of a preferred embodiment thereof with reference with the attached drawings therein.

DETAILED DESCRIPTION OF PREFERRED EMBODIMENTS OF THE INVENTION

Figure 1:
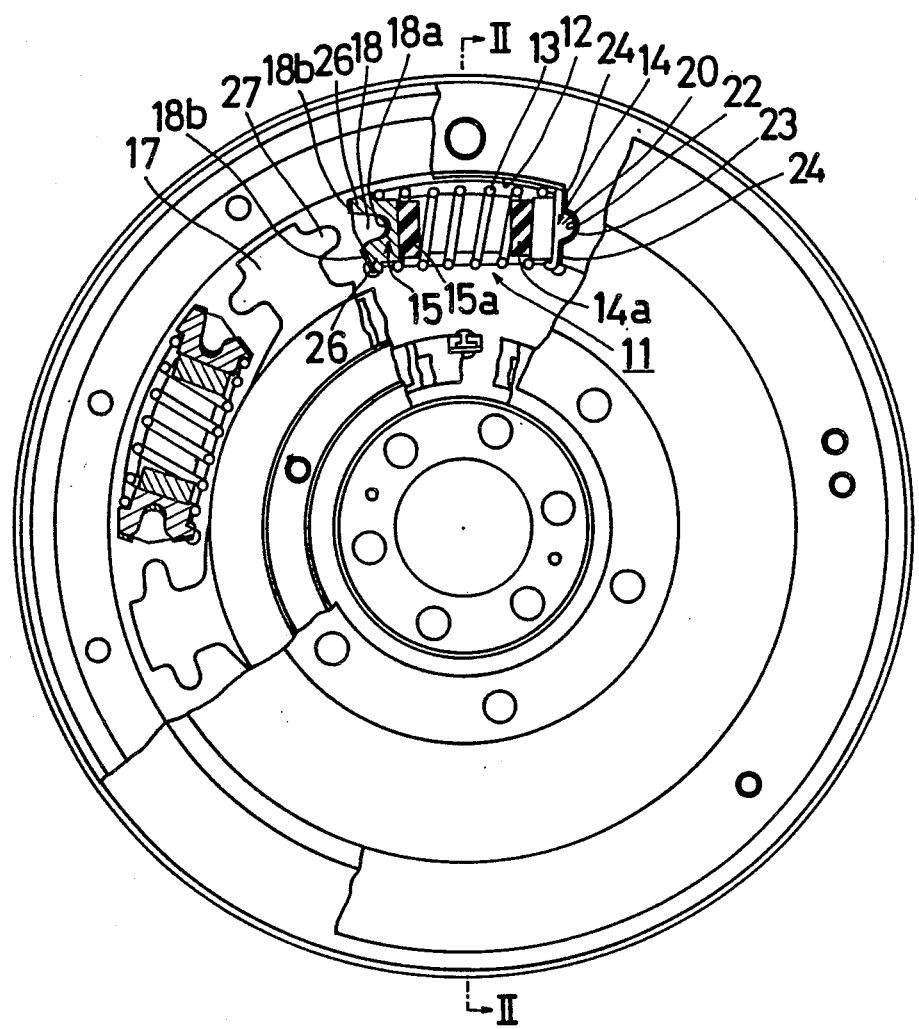
FIG. 1 is a front view, partially in section of a drive transmitting mechanism according to the present invention.
Figure 2:
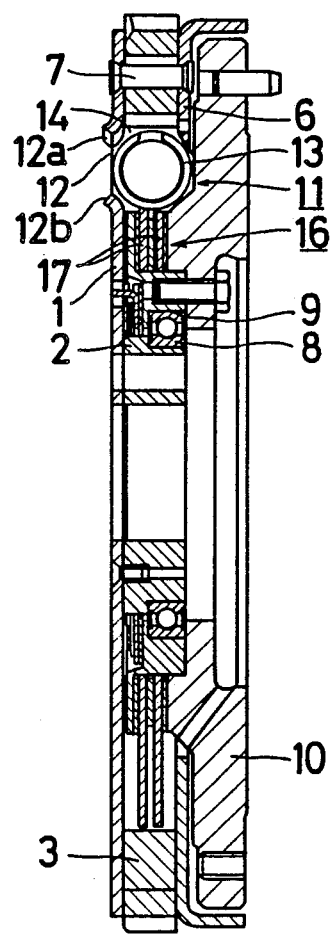
FIG. 2 is a sectional view taken along the line II—II in FIG. 1.

A drive transmitting mechanism comprises a drive mechanism, a driven mechanism 16, and a damping mechanism 11. The drive mechanism comprises a plurality of drive plates 1, 2, 3, and 6. The driven mechanism comprises a driven plate 17 and a flywheel 10.

The drive plate 1 is connected to an output shaft of an engine (not shown) by a bolt and is integrally rotated with a crankshaft of the engine. The drive plate 1 is of circular shape and is pressed against inner and outer circular drive plates 2 and 3. The inner drive plate 2 is disposed radially inwardly of the outer drive plate 3. The side surfaces of the inner and outer drive plates 2, 3 which face the engine contact the drive plate 1. The side surface of the outer drive plate 3 which faces the flywheel 10 contacts the circular drive plate 6. The drive plate 1 and drive plate 6 are integrally connected to the drive plate 3 by rivets 7. The flywheel-facing side surface of the inner drive plate 2 has a circular groove 9 receiving a bearing 8. The bearing 8 is fixed between the drive plate 2 and the flywheel 10. The driven plate 17 and the flywheel 10 are fixedly interconnected.

In radially outer portions of the drive plate 1 and the drive plate 6, a plurality of elongated recesses 12 is provided. Each recess has a sufficient circumferential extent to receive a spring mechanism 11 which acts as a vibration damping mechanism. An upper end portion 12a and a lower end portion 12b of each recess 12 are defined by bent portions of the drive plate 1, the bending occurring at a slightly oblique direction relative to the drive plate 1. The bent portions serve as a guide for coil springs 13 of the spring damping mechanism 11.

The spring mechanism 11 comprises a plurality of the circumferentially flexible coil springs 13, each of which is provided with two synthetic resin spring seats 14, 15 disposed at both ends of the coil spring 13. The spring seat 14 is interposed circumferentially between the coil spring 13 and the drive plates 1, 6. The spring seat 15 is interposed circumferentially between the coil spring 13 and the driven plate 17 of the driven mechanism 16.

Figure 3:
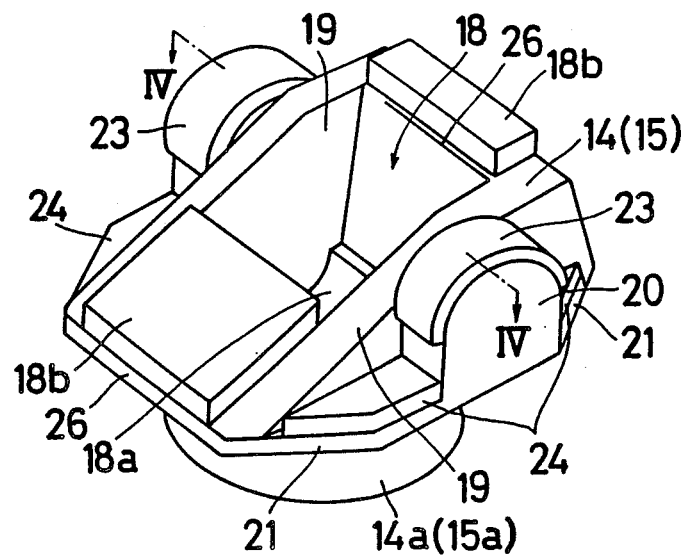
FIG. 3 is a perspective view of a spring seat of the invention.
Figure 4:
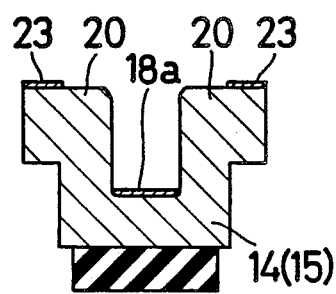
FIG. 4 is a sectional view of a spring seat, taken along the line IV—IV in FIG. 3.

The seats 14 and 15 are identical, and thus only the seat 14 will be discussed in the following description. As shown in FIG. 3, the seat 14 has a concave portion 18 at the center thereof and two convex portions 20 located adjacent to outer surfaces of side walls 19 which form the concave portion 18. Shoulder portions 21 are located forwardly and rearwardly of each convex portion 20. Those shoulder portions extend between the concave and convex portions 18, 20. Each convex portion 20 cooperates with a corresponding semicircular concave portion 22 of the drive plates 1, 6. Those concave portions 22 are formed on edges of the drive plates 1, 6 that define the recesses 12. This arrangement facilitates the transmission of force from the drive plates 1, 6 to the seat 14. The concave portion of the spring seat 14 is engaged with a circumferential convex portion 27 of the driven plate.

At the bottom of the concave portion 18 of the spring seat 14, an elastic member 18a is adhered. On an end surface of each concave portion 20 facing the convex portion 22, an arc-shaped rubber elastic strip 23 is adhered. Adjacent the two sides of the concave portion not occupied by the convex portions, there are provided two planar elastic members 18b. On the shoulder portions 21 of each spring seat 14, planer-shaped rubber elastic members 24 are adhered. Surfaces of the spring seat 14 which face each other through the coil spring 13 carry elastic members 14a, 15a for stop control as the seats 14, 15 converge. The elastic members 14a, 15a and elastic members 18a, 18b, 23, 24 are preferably made of the same elastic material, such as rubber or plastic for example. The elastic members can be separately formed and bonded by an adhesive to the spring seat, or they can be integrally formed in situ on the spring seat. When the elastic portions 14a, 15a and the elastic portions 18a, 18b, 23, 24 are integrally formed on the spring seat 14, a communicating hole is provided at the bottom portion of the concave portion 18 of the spring seat 14, and a groove is provided in a lateral portion of the spring seat 14 (i.e., at an outer surface of each wall 19) instead of or in addition to the communicating hole. Such an expedient maximizes the connection of the plastic members with the spring seat.

When the elastic portions 14a, 15a contact each other after a compression of the coil spring 13, the retaining strength of the coil spring 13 and the elastic portions 14a, 15a oppose and absorb the torque variations.

Figure 5:
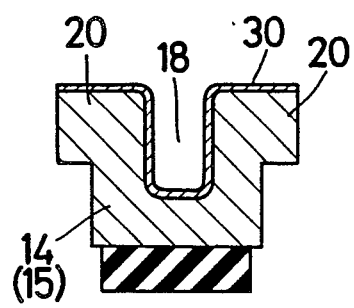
FIG. 5 is a view similar to FIG. 4 of another embodiment of the spring seat.

The elastic portions 18a, 18b, 23, 24 can alternatively be formed as a one-piece body 30 as depicted in FIG. 5.

During the starting or stopping of the engine, the torque variation is greatly increased. During the idling of the engine, the torque variation is slightly decreased. Regardless of the amount of torque acting on the damping mechanism, noise will be suppressed by the elastic members 18a, 18b, 23, 24 as the spring seats 14 (or 15) impact against the drive (or driven) plates. Since the surfaces of those elastic members are of relatively wide area, the stresses imposed on the elastic members is minimized, so as to maximize the life thereof.

It will be appreciated by those skilled in the art that various additions, substitutions, modifications and omissions may be made to the foregoing disclosed preferred embodiment of the invention without departing from the spirit or scope of the invention.

What is claimed is:

1. A rotary drive transmitting mechanism comprising rotary drive means adapted to be rotatably driven by an engine; rotary driven means including a flywheel operably connected to said drive means; and damping means including a coil spring operably disposed between said drive means and said drive means in drive transmitting relationship therewith; said spring carrying first and second spring seats at opposite ends thereof for contacting respective ones of said drive means and said driven means, said first seat including a first surface facing said drive means, said second seat including a second surface facing said driven means, and elastic means disposed on said first and second surfaces for suppressing noise tending to occur in response to impact between said first and second seats and said drive means and driven means, respectively, each of said first and second surfaces including concave and convex portions; each of said drive means and said driven means including convex and concave portions facing said concave and convex portions respectively, of said first and second surfaces, said elastic means comprising a first one-piece member covering both said concave and convex portions of said first surface, and a second one-piece member covering both said concave and convex portions of said second surface.

2. A rotary drive transmitting mechanism according to claim 1 wherein said first and second elastic members are integrally formed in situ on said first and second surfaces, respectively.

3. A rotary drive transmitting mechanism according to claim 1 wherein said first surface includes a generally planar shoulder extending between said concave and convex portions of said first surface, said first one-piece elastic member disposed on said shoulder, said second surface including a generally planar shoulder extending between said concave and convex portions of said second surface, said second one-piece elastic member disposed on said last-named shoulder.

4. A rotary drive transmitting mechanism according to claim 1 wherein each of said first and second spring seats includes an additional surface, said additional surfaces facing one another through said spring, and additional elastic means disposed on each of said additional surfaces.

* * * * *